(12) United States Patent
Singer et al.

(10) Patent No.: US 7,392,219 B2
(45) Date of Patent: *Jun. 24, 2008

(54) SYSTEM AND METHOD FOR VARIABLY REGULATING ORDER ENTRY IN AN ELECTRONIC TRADING SYSTEM

(75) Inventors: Scott F. Singer, Lake Bluff, IL (US); Steven J. Carroll, Wheeling, IL (US); Michael J. Burns, Chicago, IL (US)

(73) Assignee: Trading Technologies International, Inc., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/418,495

(22) Filed: May 3, 2006

(65) Prior Publication Data

US 2006/0259414 A1    Nov. 16, 2006

Related U.S. Application Data

(63) Continuation of application No. 10/403,333, filed on Mar. 31, 2003.

(51) Int. Cl.
*G06Q 40/00* (2006.01)
(52) U.S. Cl. ............................ 705/37; 705/35
(58) Field of Classification Search ............ 705/37, 705/35
See application file for complete search history.

(56) References Cited

U.S. PATENT DOCUMENTS

| | | | |
|---|---|---|---|
| 4,412,287 A * | 10/1983 | Braddock, III | ............... 705/37 |
| 4,674,044 A | 6/1987 | Kalmus | |
| 4,750,135 A | 6/1988 | Boilen | |
| 4,903,201 A | 2/1990 | Wagner | |
| 5,038,284 A | 8/1991 | Kramer | |
| 5,077,665 A | 12/1991 | Silverman | |
| 5,101,353 A | 3/1992 | Lupien | |
| 5,136,501 A | 8/1992 | Silverman | |
| 5,270,922 A | 12/1993 | Higgins | |
| 5,297,031 A * | 3/1994 | Gutterman et al. | ............ 705/37 |

(Continued)

FOREIGN PATENT DOCUMENTS

EP    1067471    1/2001

(Continued)

OTHER PUBLICATIONS

Kopin Tan, Technology Makes it easier to trade spreads, Oct. 2, 2001, Wall Street Journal, p. B11.*

(Continued)

*Primary Examiner*—James P. Trammell
*Assistant Examiner*—Scott Trotter
(74) *Attorney, Agent, or Firm*—McDonnell Boehnen Hulbert & Berghoff LLP

(57) ABSTRACT

A system and method are provided to intelligently limit the frequency at which automated or semi-automated trading tools move or re-price orders in an exchange order book. A tolerance may be input that limits when one or more orders in the exchange order book are moved from one price to another. The system and method assist in reducing the number of orders that are entered into the system which can lead to reduced exchange transaction fees, lost queue position, and reduce network bandwidth consumption.

10 Claims, 7 Drawing Sheets

U.S. PATENT DOCUMENTS

| | | | |
|---|---|---|---|
| 5,297,032 A | | 3/1994 | Trojan |
| 5,339,392 A | * | 8/1994 | Risberg et al. ............. 715/762 |
| 5,689,651 A | | 11/1997 | Lozman |
| 5,701,427 A | * | 12/1997 | Lathrop ...................... 709/237 |
| 5,774,877 A | | 6/1998 | Patterson |
| 5,787,402 A | | 7/1998 | Potter |
| 5,793,301 A | | 8/1998 | Patterson |
| 5,797,002 A | | 8/1998 | Patterson |
| 5,819,238 A | | 10/1998 | Fernholz |
| 5,845,266 A | | 12/1998 | Lupien |
| 5,903,478 A | * | 5/1999 | Fintel et al. .................... 703/6 |
| 5,915,245 A | | 6/1999 | Patterson |
| 5,924,082 A | | 7/1999 | Silverman |
| 5,924,083 A | | 7/1999 | Silverman |
| 5,926,801 A | | 7/1999 | Matsubara |
| 5,946,667 A | | 8/1999 | Tull |
| 5,963,923 A | * | 10/1999 | Garber ........................ 705/37 |
| 6,012,046 A | | 1/2000 | Lupien |
| 6,014,643 A | | 1/2000 | Minton |
| 6,016,483 A | | 1/2000 | Rickard et al. ................ 705/37 |
| 6,035,287 A | | 3/2000 | Stallaert |
| 6,098,051 A | | 8/2000 | Lupien |
| 6,131,087 A | | 10/2000 | Luke |
| 6,134,535 A | | 10/2000 | Belzberg |
| 6,191,799 B1 | * | 2/2001 | Purdy ......................... 345/473 |
| 6,195,647 B1 | | 2/2001 | Martyn |
| 6,272,474 B1 | | 8/2001 | Garcia |
| 6,278,982 B1 | | 8/2001 | Korhammer |
| 6,282,521 B1 | | 8/2001 | Howorka |
| 6,400,996 B1 | * | 6/2002 | Hoffberg et al. ............. 700/83 |
| 6,408,282 B1 | | 6/2002 | Buist ........................... 705/37 |
| 6,418,419 B1 | | 7/2002 | Neibor |
| 6,493,682 B1 | | 12/2002 | Horrigan et al. ............. 705/36 |
| 6,915,301 B2 | * | 7/2005 | Hirsch ........................ 707/102 |
| 6,963,856 B2 | * | 11/2005 | Lutnick et al. ................ 705/37 |
| 7,076,452 B2 | * | 7/2006 | Florance et al. ............. 705/26 |
| 7,082,398 B1 | * | 7/2006 | Apple et al. .................. 705/1 |
| 7,171,386 B1 | * | 1/2007 | Raykhman .................. 705/37 |
| 2002/0023038 A1 | | 2/2002 | Fritsch |
| 2002/0046146 A1 | | 4/2002 | Otero |
| 2002/0046149 A1 | | 4/2002 | Otero |
| 2002/0046151 A1 | | 4/2002 | Otero |
| 2002/0046156 A1 | | 4/2002 | Horn |
| 2002/0049661 A1 | | 4/2002 | Otero |
| 2002/0055899 A1 | | 5/2002 | Williams |
| 2002/0059129 A1 | | 5/2002 | Kemp |
| 2002/0099644 A1 | | 7/2002 | Kemp |
| 2002/0128950 A1 | | 9/2002 | Wu |
| 2002/0138401 A1 | | 9/2002 | Allen |
| 2002/0151992 A1 | * | 10/2002 | Hoffberg et al. ............. 700/83 |
| 2002/0169703 A1 | * | 11/2002 | Lutnick et al. ................ 705/37 |
| 2002/0178104 A1 | * | 11/2002 | Hausman ..................... 705/37 |
| 2002/0188555 A1 | | 12/2002 | Lawrence |
| 2002/0194115 A1 | * | 12/2002 | Nordlicht et al. ............. 705/37 |
| 2003/0004852 A1 | | 1/2003 | Burns |
| 2003/0023542 A1 | | 1/2003 | Kemp |
| 2003/0033235 A1 | | 2/2003 | Hummelgren |
| 2003/0149636 A1 | * | 8/2003 | Lutnick et al. ................ 705/26 |
| 2003/0200167 A1 | | 10/2003 | Kemp |
| 2004/0193526 A1 | | 9/2004 | Singer |
| 2006/0265314 A1 | | 11/2006 | Singer |

FOREIGN PATENT DOCUMENTS

| | | |
|---|---|---|
| EP | 1104904 A1 | 6/2001 |
| EP | 1217564 A2 | 6/2002 |
| EP | 1217564 A3 | 7/2002 |
| EP | 1246111 A2 | 10/2002 |
| WO | WO 91/14231 | 9/1991 |
| WO | WO 98/49639 | 11/1998 |
| WO | WO 99/19821 | 4/1999 |
| WO | WO 99/30259 | 6/1999 |
| WO | WO 99/53424 | 10/1999 |
| WO | WO00/48113 A1 | 8/2000 |
| WO | WO00/51043 A1 | 8/2000 |
| WO | WO 00/52619 | 9/2000 |
| WO | WO 00/62187 | 10/2000 |
| WO | WO00/65510 A1 | 11/2000 |
| WO | WO 01/16830 | 3/2001 |
| WO | WO 01/16852 | 3/2001 |
| WO | WO01/22266 A2 | 3/2001 |
| WO | WO 01/22315 | 3/2001 |
| WO | WO 01/65403 | 9/2001 |
| WO | WO 01/88808 | 11/2001 |
| WO | WO 02/103601 | 12/2001 |
| WO | WO 02/29686 | 4/2002 |
| WO | WO02/33621 A1 | 4/2002 |
| WO | WO02/33623 A1 | 4/2002 |
| WO | WO02/33635 A1 | 4/2002 |
| WO | WO02/33636 A1 | 4/2002 |
| WO | WO02/33637 A1 | 4/2002 |
| WO | WO02/47006 A1 | 6/2002 |
| WO | WO02/079940 A2 | 10/2002 |
| WO | WO02/080433 A2 | 10/2002 |
| WO | WO02/097580 A2 | 12/2002 |
| WO | WO 03/077061 | 9/2003 |
| WO | WO 03/090032 | 10/2003 |
| WO | WO 04/001653 | 12/2003 |

OTHER PUBLICATIONS

International Search Report for PCT/US04/09578 mailed Sep. 13, 2004.

\* cited by examiner

FIG. 8

| E/W 702 | BidQ 704 | AskQ 706 | Prc 708 |
|---|---|---|---|
| | | | 152.5 |
| | | | 152.0 |
| | | 10 | 151.5 |
| | | 10 | 151.0 |
| | | 10 | 150.5 |
| | | 10 | 150.0 |
| | 10 | | 149.5 |
| | 1 | | 149.0 |
| | | | 148.5 |
| | | | 148.0 |
| | | | 147.5 |
| B 0<br>W 1 | 1 | | 147.0 |
| | | | 146.5 |
| | 10 | | 146.0 |
| | | | 145.5 |

FIG. 9

| E/W 702 | BidQ 704 | AskQ 706 | Prc 708 |
|---|---|---|---|
| | | | 204.0 |
| | | | 203.5 |
| S 0<br>W 1 | | 21 | 203.0 |
| | | 10 | 202.5 |
| | | 10 | 202.0 |
| | | 10 | 201.5 |
| | | 11 | 201.0 |
| | | 10 | 200.5 |
| | 20 | | 200.0 |
| | 10 | | 199.5 |
| | 10 | | 199.0 |
| | 10 | | 198.5 |
| | 10 | | 198.0 |
| | 10 | | 197.5 |
| | | | 197.0 |

SYSTEM AND METHOD FOR VARIABLY REGULATING ORDER ENTRY IN AN ELECTRONIC TRADING SYSTEM

CROSS REFERENCE TO RELATED APPLICATION

This application is a continuation of U.S. patent application Ser. No. 10/403,333 filed Mar. 31, 2003, entitled "System and Method for Variably Regulating Order Entry in an Electronic Trading Environment" the contents of which are fully incorporated herein by reference.

FIELD OF INVENTION

The present invention is directed towards electronic trading. Specifically, the present invention is directed to variably regulating order entry in electronic trading related systems.

BACKGROUND

Trading methods have evolved from a manually intensive process to a technology enabled, electronic platform. With the advent of electronic trading, a user or trader can be in virtually direct contact with the market, from practically anywhere in the world, performing near real-time transactions, and without the need to make personal contact with a broker.

Electronic trading is generally based on a host exchange, one or more computer networks, and client devices. In general, the host exchange includes one or more centralized computers to form the electronic heart. Its operations typically include maintaining an exchange order book that records unexecuted orders, order matching, providing price and order fill information, and managing and updating a database that records such information. The host exchange is also equipped with an external interface that maintains uninterrupted contact to the client devices and possibly other trading-related systems.

Using client devices, traders link to the host exchange through one or more networks. A client device is a computer such as a personal computer, laptop computer, hand-held computer, and so forth that has network access. A network is a group of two or more computers or devices linked together, which can be characterized by topology, protocol, and architecture. For example, some market participants may link to the host through a direct network connection such as a T1 or ISDN. Some participants may link to the host exchange through direct network connections and through other common network components such as high-speed servers, routers, and gateways. The Internet, a well-known collection of networks and gateways, can be used to establish a connection between the client device and the host exchange. There are many different types of wired and wireless networks and combinations of network types known in the art that can link traders to the host exchange.

Sometimes, on their machines, traders use automated or semi-automated trading tools that automatically or semi-automatically send orders to the exchange. Such trading tools are usually provided to, among other things, facilitate fast and accurate order entry. For instance, an automated tool might quickly calculate one or more order parameters, such as order price or order quantity, based on market conditions, or some other reference condition, and then automatically send an order with these parameters to an exchange for matching. And according to many existing and popular exchanges today, orders are electronically entered in an exchange order book in the sequence in which they are entered into the market (a first-in, first-out, or FIFO matching system). Based on this sequence, and the availability of market quantity, orders are filled, with priority given to the first order entered, then the second (next) order entered, and so forth.

Using a conventional automated or semi-automated tool, however, when the market conditions change, the trading tool must usually calculate the one or more order parameters and then move or re-price the order in the exchange order book to a new price associated with the new order parameter(s). As a result, the original order position in the exchange order book is lost and the trader might also be charged each time the order is moved or re-priced in the market. Therefore, for the same reason that automated or semi-automated trading tools make desirable trading tools (e.g., they can rapidly fire orders and/or order changes into the market to capture market opportunities before the competition), such tools can also make undesirable trading tools because, among other things, they can quickly consume network bandwidth and they can lead to a significant increase in exchange related fees.

It is therefore desirable to offer one or more tools that can regulate order entry in trading related tools, and in particular, regulate order entry in trading tools that have automated or semi-automated order entry systems.

BRIEF DESCRIPTION OF THE DRAWINGS

FIG. 2 is a block diagram that represents a client device of FIG. 1 in greater detail in which the preferred embodiments may be implemented on;

FIGS. 8-9 are block diagrams that represent displays of legs of the spread market of FIG. 7 which are used to illustrate the preferred process shown in FIG. 5.

DETAILED DESCRIPTION

Figure 1:
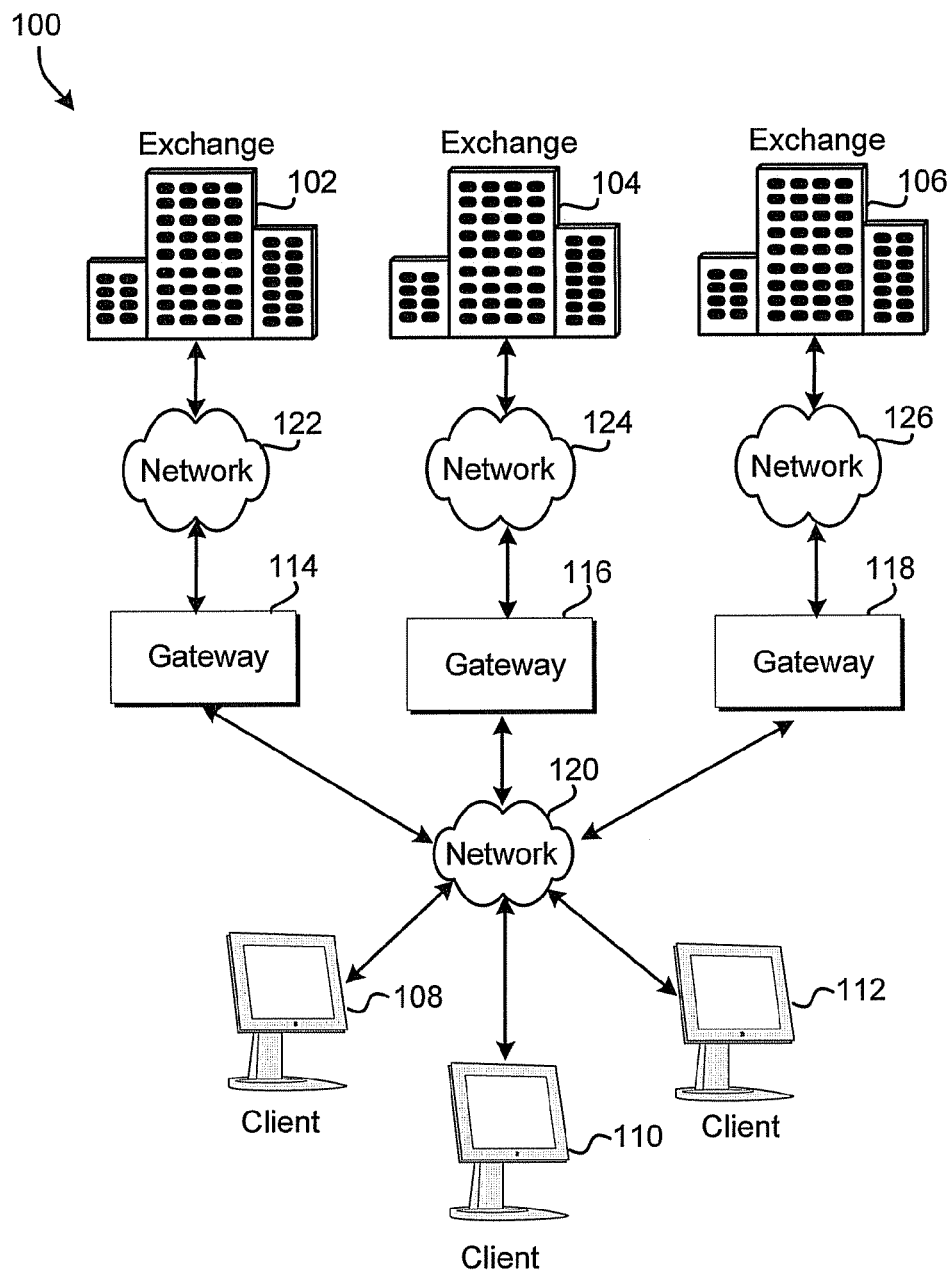
FIG. 1 is a block diagram that represents a trading system in which the preferred embodiments may be implemented with to limit the frequency at which a trading tool moves or re-prices orders in a market at an exchange.

Sometimes a trader is willing to limit the moving or re-pricing of orders in a market when changes in market conditions are rather insignificant to the trader. Not only can this maintain the trader's position in the order queue at the exchange, it may reduce the number of exchange transactions and fees associated with moving or re-pricing orders in the market, and it may also reduce network bandwidth consumption. Therefore, the preferred embodiments are provided to intelligently limit the frequency at which automated or semi-automated trading tools move or re-price orders in an exchange order book. According to the preferred embodiments, a trader can program ranges which can each represent varying levels of acceptable movement in the market. Then, if market conditions remain within an acceptable level according to one of the particular ranges, the preferred embodiments refrain the trading tools from moving or re-pricing the order(s) in the market. If the market conditions move outside of the acceptable level according to one of the particular ranges, the preferred embodiments allow the trading tools to move or re-price the order(s) in the market.

For ease of explanation, the preferred embodiments are described in combination with an automated spread trading tool. Accordingly, the preferred embodiments assist the automated spread trading tool by regulating the automatic moving or re-pricing of orders in legs to achieve a desired spread. One such automated spread trading tool is described in U.S. patent application Ser. No. 10/137,979, filed on May 3, 2002 and entitled, "System and Method for Performing Automatic Spread Trading," the contents of which are incorporated herein by reference. Additionally, the incorporated application describes re-pricing of quotes, which is a feature to limit the number of times a trading tool re-quotes the legs. The preferred embodiments described herein build on that concept by allowing a user to input more than one range of inside and outside parameters to variably and more flexibly control order entry of trading systems, and in particular, automated and semi-automated trading tools. Additionally, the preferred embodiments allow a user to set one or more ranges for each leg of a spread. Using the teachings described herein the preferred embodiments can also accommodate any type of trading strategy.

Although the preferred embodiments are described in combination with an automated spread trading tool, it should be understood that the preferred embodiments may be embodied in many different forms with many different types of trading tools. The trading tools which might receive great benefit from the preferred embodiments include those that use automated or semi-automated order entry systems. Then, the preferred embodiments can automatically regulate the frequency at which those automated or semi-automated order entry systems move or re-price orders in a market. Nonetheless, trading tools which have non-automated order entry systems might also receive a benefit from the preferred embodiments, therefore the present invention should not be construed as limited to the embodiments set forth herein. The preferred embodiments now will be described more fully hereinafter with reference to the accompanying drawings.

I. An Overview of a System Architecture

FIG. 1 is a block diagram that illustrates an electronic trading system 100 in accordance with the preferred embodiments. The system 100 includes one or more exchanges 102, 104, 106 and one or more client devices 108, 110, 112. Intermediate devices such as gateways 114, 116, 118, routers (not shown), and other such types of network devices may be used to connect network 120 to networks 122, 124, 126 so that client devices 108, 110, 112 and exchanges 102, 104, 106 can communicate market information. It should be understood that the present invention is not limited to any particular system configuration. For example, networks 122, 124, and 126 could represent the same network, network 120 could represent the same network as networks 122, 124, and 126, or client devices 108, 110, 112 could connect separately to gateways 114, 116, 118. Of course, there are many other system configurations on which the preferred embodiments may be implemented.

A. Exchange

Any of exchanges 102, 104, 106 may represent, for example, the London International Financial Futures and Options Exchange (LIFFE), the Chicago Board of Trade (CBOT), the New York Stock Exchange (NYSE), the Chicago Mercantile Exchange (CME), the Exchange Electronic Trading ("Xetra," a German stock exchange), or the European Exchange ("Eurex"), or any other exchange that participates in electronic trading. Exchanges 102, 104, 106 might also refer to other facilities, which include basic to more complex systems that automatically match incoming orders. These example exchanges and other exchanges are well known in the art. Communication protocols required for connectivity to one of these exchanges are also well known in the art.

Exchanges 102, 104, 106 allow traders to log onto a market to trade tradeable objects. As used herein, that the term "tradeable objects," refers simply to anything that can be traded with a quantity and/or price. It includes, but is not limited to, all types of tradeable objects such as financial products, which can include, for example, stocks, options, bonds, futures, currency, and warrants, as well as finds, derivatives and collections of the foregoing, and all types of commodities, such as grains, energy, and metals. The tradeable object may be "real," such as products that are listed by an exchange for trading, or "synthetic," such as a combination of real products that is created by the user. A tradeable object could actually be a combination of other tradeable object, such as a class of tradeable objects.

An exchange 102, 104, 106 can implement numerous types of order execution algorithms, sometimes the type of algorithm depends on the tradeable object being traded. The preferred embodiments may be adapted by one skilled in the art to work with any particular order execution algorithm. Some example order execution algorithms include first-in-first-out and pro rata algorithms. The first-in-first-out (FIFO) algorithm, used for some markets listed with Eurex for example, gives priority to the first person to place an order. The pro rata algorithm, used for some markets listed with LIFFE for example, splits all orders for the same price. The present invention is not limited to any particular type of order execution algorithm.

Regardless of the type of order execution algorithm used, each exchange 102, 104, 106 preferably provides similar types of information to subscribing client devices 108, 110, 112. Market information may include data that represents just the inside market. The inside market is the lowest sell price (best ask) and the highest buy price (best bid) at a particular point in time. Market information may also include market depth. Market depth refers to quantities available at the inside market and can also refer to quantities available at other prices away from the inside market. The quantity available at a given price level is usually provided by the host exchange in aggregate sums. In other words, an exchange usually provides the total buy quantity and the total sell quantity available in the market at a particular price level in its data feed. The extent of the market depth available to a trader usually depends on the exchange. For instance, some exchanges provide market depth for all (or most) price levels, while some provide only quantities associated with the inside market, and others may provide no market depth at all. Additionally, exchanges 102, 104, 106 can offer other types of market information such as the last traded price (LTP), the last traded quantity (LTQ), and order fill information.

B. Gateway

Gateways 114, 116, 118 are devices such as a mainframe, superminicomputer, minicomputer, workstation, microcomputer that connect network 120 to networks 122, 124, 126 so that market information can be successfully passed between client devices 108, 110, 112 and exchanges 102, 104, 106. Gateways 114, 116, 118 receive market information from exchanges 102, 104, 106 and convert it to a form compatible with the protocols used by client devices 108, 110, 112 using conversion techniques known in the art. Also, as known by those skilled in the art, gateways 114, 116, 118 may have one or more servers to support the data feeds, such as a price server for processing price information, an order server for processing order information, and a fill server for processing fill information. A trader at one of client devices 108, 110, 112 can subscribe to price information, order information, and fill information for a particular market hosted at exchanges 102, 104, 106. Gateways 114, 116, 118 also receive transaction information, such as orders, order changes, queries, etc. from client devices 108, 110, 112 and forward that information to corresponding exchanges 102, 104, 106.

C. Client Device

Client devices 108, 110, 112 are devices that provide an interface for traders to trade at one or more markets listed with one, some, or all of exchanges 102, 104, 106. Some examples of client devices include a personal computer, laptop computer, hand-held computer, and so forth. Client devices 108, 110, 112, according to the preferred embodiments, include at least a processor and memory. The processor and memory, which are both well known computer components, are not shown in the Figure for sake of clarity. Preferably, the processor has enough processing power to handle and process the various types of market information. Of course, the more market information which is received and processed, the more processing power is preferred. However, any present day processor has enough capability to perform at least the most basic part of the present invention.

Memory may include computer readable medium. The term computer readable medium, as used herein, refers to any medium that participates in providing instructions to processor for execution. Such a medium may take many forms, including but not limited to, non-volatile media, volatile media, and transmission media. Non-volatile media includes, for example, optical or magnetic disks, such as storage device. Volatile media includes dynamic memory, such as main memory or RAM (random access memory). Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, and any other memory chip or cartridge, or any other medium from which a computer can read.

Client devices 108, 110, 112 receive market information from any of exchanges 102, 104, 106. According to the preferred embodiments, market information is displayed to the trader(s) on the visual output device or display device of client devices 108, 110, 112. The output device can be any type of display. For example, the display could be a CRT-based video display, an LCD-based or a gas plasma-based flat-panel display, a display that shows three-dimensional images, or some other type of display. The present invention is not limited to any particular type of display.

Upon viewing the market information or a portion thereof, a trader may wish to send orders to an exchange, cancel orders in a market, change orders in a market, query an exchange, and so on. To do so, the trader may input various commands or signals into the client device 108, 110, 112, for example, by typing into a keyboard, inputting commands through a mouse, or inputting commands or signals through some other input device. Upon receiving one or more commands or signals, client devices 108, 110, 112 preferably generate transaction information. For instance, a trader may click a mouse button to initiate an order to buy a tradeable object. Then, transaction information would include an order to buy a particular quantity of the tradeable object at a particular price. There are many different types of messages and/or order types that can be submitted, all of which may be considered various types of transaction information. Once generated, transaction information is sent from client device 108, 110, 112 to host exchange 102 over network(s) 120, 122, 124, 126.

Figure 2:
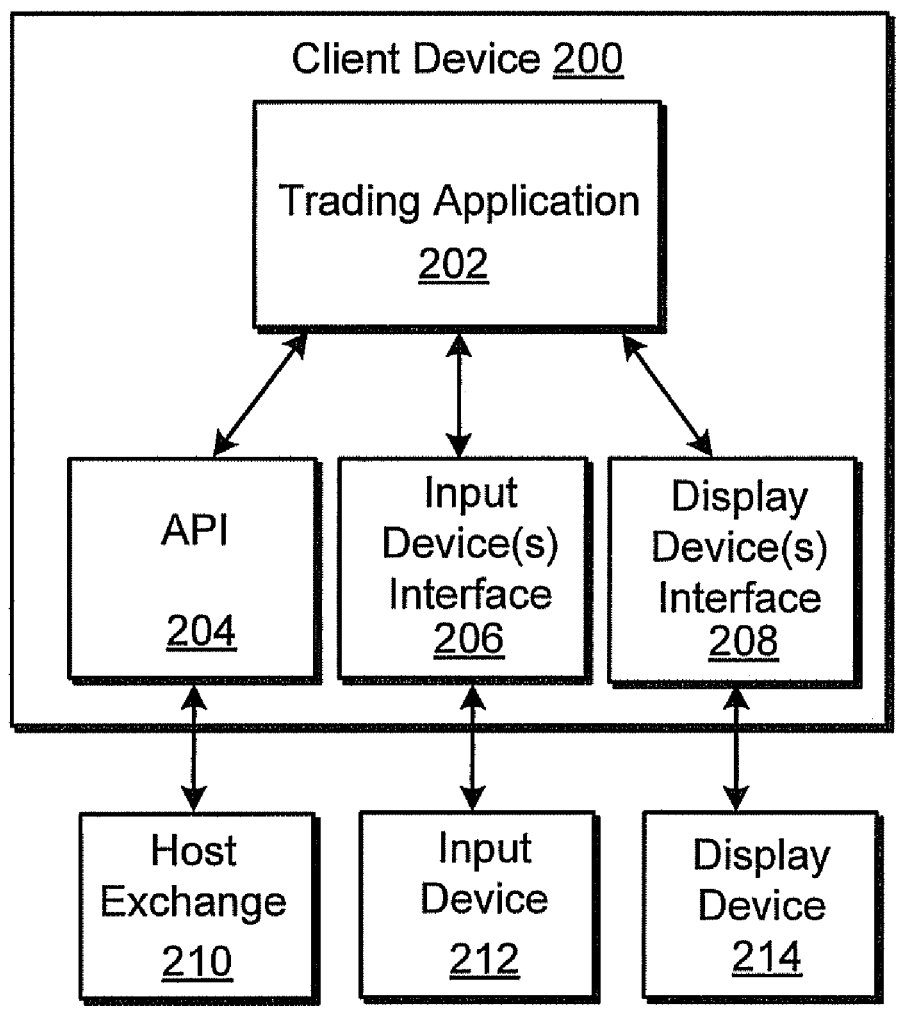

FIG. 2 shows an overview of client device 200 which is similar to the type of client devices 108, 110, 112 shown in FIG. 1. Client device 200 can be any particular type of computing device, examples of which were enumerated above with respect to the client devices. According to the preferred embodiment, client device 200 has trading application 202 stored in memory that when executed arranges and displays market information in many particular ways, usually depending on how the trader prefers to view the information. Trading application 202 may also implement an automated or semi-automated trading tool such as the automated spread trading tool that automatically sends orders into underlying legs to achieve a spread. Additionally, the preferred embodiments for regulating the trading tools may be part of trading application 202. Preferably, trading application 202 has access to market information through API 204 (or application programming interface) and trading application 202 can also forward transaction information to exchange 210 via API 204. Alternatively, API 204 could be distributed so that a portion of the API rests on the client device 200 and a gateway, or at the exchange 210. Additionally, trading application 202 may receive signals from input device 212 via input device interface 206 and can be given the ability to send signals to display device 214 via display device interface 208.

Alternatively, the preferred embodiments may be a separate program from trading application 202, but still stored in memory and executed on client device 200. In another alternative embodiment, the preferred embodiments may be a program stored in memory and executed on a device other than client device 200. Example devices may include a gateway (e.g., gateways 114, 116, or 118 in FIG. 1) or some other well known intermediary device.

II. Automatic Spread Trading Overview

The preferred embodiments are described as variably regulating the frequency at which an automated spread trading tool moves or re-prices orders in an exchange order book. However, as pointed out earlier, the present invention is not limited for use with an automated spread trading tool, but may be applied to any particular trading tool that has an order entry system where limiting the frequency at which orders are moved or re-priced in the market may be beneficial. For example, another type of trading tool that has an automated order entry system and may benefit using the preferred embodiments is described in U.S. patent application Ser. No. 10/284,584, filed on Oct. 31, 2002 and entitled, "System and Method for Automated Trading," the contents of which are incorporated herein by reference. One skilled in the art may readily adapt the preferred embodiments to work with this type of automated trading tool, for example, or some other type of trading tool using the teachings described herein.

To assist in understanding how an automated spread trading tool might work, a general description is provided below. However, an automated spread trading tool and its functions are described in greater detail and may be referenced in an already incorporated U.S. patent application Ser. No. 10/137, 979, filed on May 3, 2002 and entitled, "System and Method for Performing Automatic Spread Trading."

According to one embodiment of an automated spread trading tool, a trader can select two or more individual tradeable objects underlying the spread, referred to herein as "legs" of the spread. The automatic spread trading tool preferably generates a spread data feed based on information in the legs and based on spread setting parameters, which are configurable by a user. The spread data feed is communicated to a graphical user interface manager where it is displayed in a spread window and where the legs may also be displayed. At the terminal, the user can enter orders in the spread window and the automated spread trading tool will automatically work the legs to achieve, or attempt to achieve, the spread. The spread is sometimes referred to herein as a synthetically created spread or synthetic spread.

Figure 3:
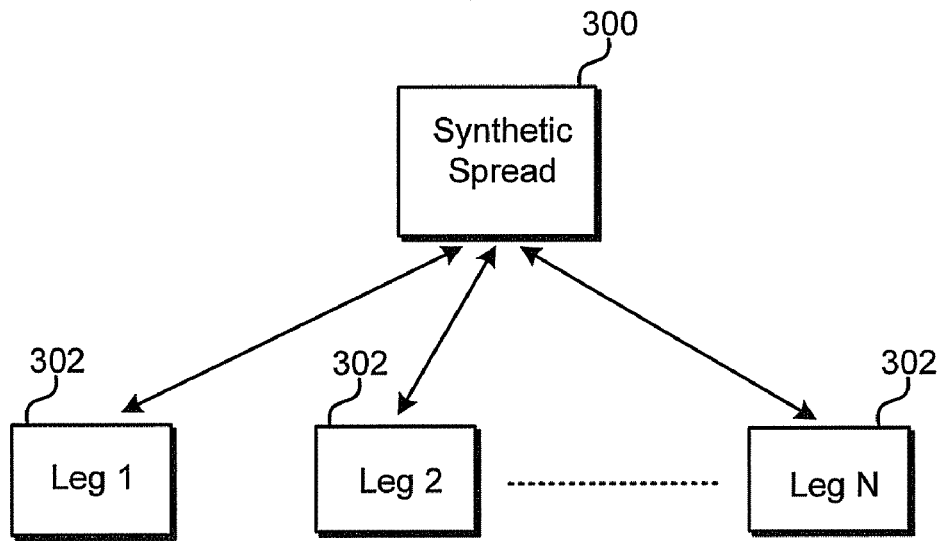
FIG. 3 is a block diagram that illustrates the relationship between a synthetically created spread and its underlying legs which is later used in understanding how the preferred embodiments may regulate order entry of an automatic spread trading tool.

FIG. 3 illustrates the relationship between a synthetically created spread 300 and its underlying "N" legs 302, where N can be any number greater than 1. For example, a spread might have two legs, three legs, four legs, and so on. Generation of the spread 300 may be based on relationships that exists between the legs 302. Some relationships which might be used are described in the above incorporated U.S. patent application Ser. No. 10/137,979. Also, one skilled in the art of trading may have their own relationships in which they prefer to use. It is not necessary to know these relationships, however, to understand the preferred embodiments.

Figure 4:
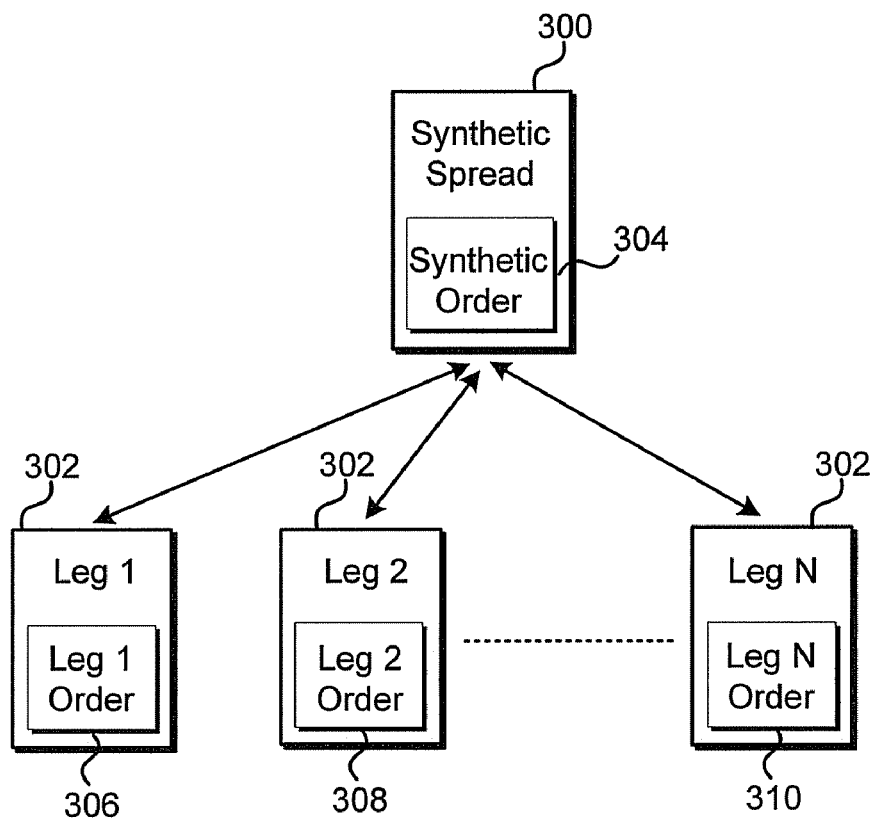
FIG. 4 is a block diagram that illustrates the relationship shown of FIG. 3 except that a spread order has been placed in the spread, and as a result, the automated spread trading has placed orders in the legs to achieve the spread.

FIG. 4 illustrates the same relationship between spread 300 and its underlying legs 302 as in FIG. 3, except that a spread order 304 has been placed. When a trader enters an order to buy or to sell the spread (e.g., spread order 304) in a synthetic market, the automated spread trading tool automatically places orders in the appropriate legs to achieve or attempt to achieve the desired spread 304. For example, to achieve spread order 304 the automated spread trading tool may automatically enter orders 306, 308, . . . 310 into the underlying legs 302 (e.g., "Leg 1," "Leg 2,". . . "Leg N"). The automated spread trading tool may, among other things, calculate the quantities and the prices for the orders 306, 308, . . . 310 based on market conditions in the other legs and one or more parameters. For example, according to one trading strategy, consider if "Leg 1 Order" 306 is a buy order, then the price of order 306 may be based on the best bid price of "Leg 2" and on the best bid price of each leg through "Leg N." Of course, depending on the trading strategy, the price of order 306 might be based only on some of the legs and not on all N legs. Alternatively, other trading strategies may be used to determine the price and quantities of the orders. For example, the price of buy order 306 may be determined based on the best ask price of "Leg 2" and on the best ask price of each leg through "Leg N" (or on only some of the N legs). Of course, the order parameters of an order in one leg can be based on other types of market conditions in the other legs such as the last traded price (LTP), the last traded quantity (LTQ), a theoretical value, or some other reference point.

According to the preferred embodiments, as the market conditions for each leg move, an effective spread order price may be calculated. For example, if market conditions for "Leg 1" change, then an effective spread order price associated with order 304 may be determined to reflect the new market conditions. Similarly, if market conditions for "Leg 2" change, then an effective spread order price associated with order 304 may be determined. Using a conventional automated spread trading tool if the effective spread order price is different from the desired spread order price, then the automated spread trading tool would move or re-price the leg orders in an exchange order book to maintain the desired spread order price. In particular, the leg order(s) would be deleted from the exchange and new leg order(s) would be sent to the exchange to maintain the desired spread price. There are other ways to change an order which may provide similar results, such as a change order request, etc. However, as mentioned above, a trader may be charged transaction fees for moving or re-pricing leg orders in the exchange order book. Additionally, by deleting the previous leg order from the exchange, the trader would have lost his or her position in the exchange order queue.

Alternatively, effective prices of spread orders are continuously calculated. For example, the preferred embodiments may be programmed to calculate effective spread order prices every second or at some other time interval. Using this alternative approach, it is not necessary to monitor changes in market conditions before an effective spread order price is calculated. Similarly to the above embodiment, however, using a conventional automated spread trading tool, if the effective price of the spread order is different from the desired price of the spread order, then the automated spread trading tool would move or re-price the leg orders in the exchange order book to maintain the desired spread price being sought.

In an alternative embodiment, the effective prices of orders in the legs may be calculated rather than calculating an effective spread order price as performed in the above embodiments. In particular, as the market conditions for each leg move, the effective prices of orders in the other legs may be calculated such that the desired spread price being sought by the trader can be maintained. For example, if market conditions for "Leg 1" change, then the effective prices of orders based on the market conditions in "Leg 1," such as order 308 through order 310 may be calculated to maintain the spread. If market conditions for "Leg 2" change, then the effective prices of orders based on market conditions in "Leg 2," such as order 306 through order 310 may be calculated to maintain the spread. Further, to maintain the desired spread price being sought, using a conventional automated spread trading tool if the effective prices of the leg orders are different from the prices of the leg orders, then the automated spread trading tool would move or re-price the leg orders in an exchange order book. In particular, the leg order(s) would be deleted from the exchange and a new leg order(s) at the effective price would be sent to the exchange. However, as mentioned above, a trader may be charged transaction fees for moving or re-pricing leg orders in the exchange order book. Additionally, by deleting the previous order from the exchange, the trader would have lost his or her position in the order queue.

Also, in another alternative embodiment, the effective prices of orders in the other legs are continuously calculated such that the desired spread price being sought by the trader can be maintained. For example, the preferred embodiments may be programmed to calculate effective leg order prices every second or at some other time interval. Using this alternative approach, it is not necessary to monitor changes in market conditions before the effective leg prices are calculated. Similarly to the above embodiment, however, to maintain the desired spread price being sought, using a conventional automated spread trading tool, if the effective prices of the leg orders are different from the prices of the leg orders, then the automated spread trading tool would move or re-price the leg orders in the exchange order book.

According to the preferred embodiments, however, before actually moving or re-pricing the leg orders in the exchange order book, the preferred embodiments determine whether it is necessary to move or re-price the leg orders based on the differences in the desired spread order price and the effective spread order price (or alternatively, the difference in the leg order prices and the effective leg order prices) and an acceptable level of market movement for which the trader is willing to allow. In other words, the preferred embodiments intelligently limit the frequency at which the automated spread trading tool moves or re-prices leg orders in the exchange order book.

According to the preferred embodiments, if the price difference between the effective spread order price and the desired spread order price falls within an acceptable level given in one of the ranges, then the leg orders preferably do not change in the exchange order book. If the price difference between the effective spread order price and the desired spread order price is outside of the acceptable level given in one of the ranges, then the leg orders are preferably moved or re-priced in the exchange order book to maintain the spread at the effective spread order price. The preferred embodiments allow for variable levels of acceptability or tolerances by having more than one range of parameters. Moreover, each leg of the spread may have its own particular set of ranges.

According to the alternative embodiments, if the price difference between the effective leg order price and the leg order price falls within an acceptable level given in one of the ranges, then the leg orders preferably do not change in the exchange order book. If the price difference between the effective leg order price and the leg order price is outside of the acceptable level given in one of the ranges, then the leg orders are preferably moved or re-priced to the effective leg order price in the exchange order book.

Figure 5:
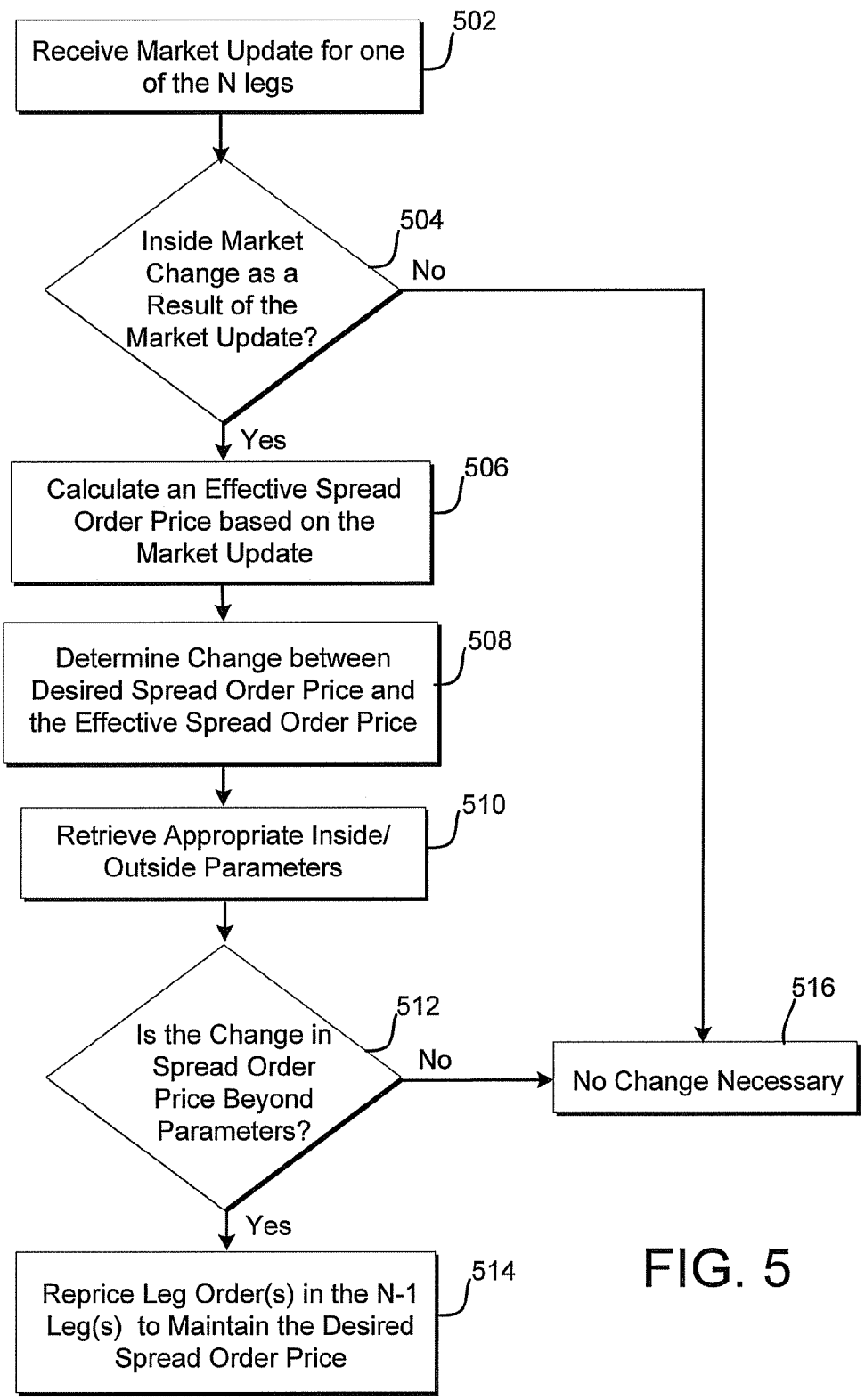
FIG. 5 is a flowchart representation depicting steps performed by a variable re-pricing system in accordance with the preferred embodiments in addition to steps taken by an automated spread trading tool.

The preferred process including the variable levels of acceptability or tolerances is outlined in more detail with respect to the flowchart shown in FIG. 5.

III. Variable Re-pricing of Orders

A method in accordance with the preferred embodiments is now described with respect to the flowchart in FIG. 5. The method is described as variably limiting the frequency at which an automated spread trading tool moves or re-prices orders in an exchange order book. However, a portion of the method is used to illustrate steps that the automated spread trading tool might take to perform its function. Such steps are not necessarily important to the understanding of the present invention, nonetheless, the steps show how the preferred embodiments may be integrated with the automated spread trading tool. It should be understood, however, that the flowchart in FIG. 5 provides only an illustrative description, and that more or fewer steps may be included in the flowchart, and/or the steps may occur in one or more orders which are different from the order of steps shown in FIG. 5. As mentioned above, it should also be understood, however, that the preferred embodiments can be readily applied to any other trading related application that has an automatic, semi-automatic, or non-automatic order entry system using the teachings described herein.

At step 502, a market update for one of the legs is received. A market update refers to any type of message which is usually sent from the exchange (or some other order matching system) to notify subscribing client devices that a change in the market has occurred. In particular, market updates are used to synchronize market information represented in the exchange order book With market information represented in order books at the client devices. For instance, one type of market update might indicate that the best bid price has changed or that the best offer price has changed. Another type of market update might indicate that a quantity has changed at a certain price.

At step 504, based on the market update received at step 502 the automated spread trading tool may determine to calculate an effective spread order price. As previously described above, according to an embodiment of an automated spread trading tool, the price of an order in one leg may be based on an inside market price (e.g., best bid or best ask) in one or more other legs. Therefore, when the inside market price has changed in a leg, it can have an effect on an order in another leg and the spread order. Also, when the quantity available at the inside market has changed, this too can have an effect on an order in another leg and the spread order. Consequently, the automated spread trading tool might be looking at different variables such as price and quantities to determine if the market conditions have changed. To illustrate how a spread trading tool might react to changing market conditions consider the following example scenarios involving a two-legged spread referred to as "Spread" which has "Leg 1" and "Leg 2" as its underlying legs. Also assume that the spread has a one-to-one spread ratio. As with any examples provided in this application, the following examples are not meant to be exhaustive in covering every possible scenario.

A. EXAMPLE 1

Assume that a trader has placed a buy order for 10 at 75 in the spread. Then, the automated spread trading tool would automatically place an order to buy 10 in Leg 1 and an order to sell 10 in Leg 2 because of the one-to-one spread ratio. According to one trading strategy, the buy order price in Leg 1 would be based in part on the best bid price in Leg 2, and the sell order price in Leg 2 would be based in part on the best offer in Leg 1. Also assume that the best bid price in Leg 2 has a quantity of 25. Subsequently, the spread trading tool received a market update for Leg 2 indicating that the quantity at the best bid price has been reduced to 15. However, the best bid price in Leg 2 has not changed. Therefore, in this example, the automated spread trading tool would preferably determine that the market conditions for Leg 2 did not change enough to move or re-price the order in Leg 1 to maintain the desired spread for 10 at 75. The spread trading tool would preferably proceed to step 516.

B. EXAMPLE 2

Assume the same facts as given in Example 1 above, except consider when the automated spread trading tool received a market update for Leg 2 indicating that the best bid price has changed. The spread trading tool may need to calculate an effective spread order price and may ultimately need to move or re-price the order in Leg 1 to maintain the desired spread for 10 at 75. Under this example scenario, the spread trading tool would preferably proceed to step 506.

C. EXAMPLE 3

Examples 1 and 2 above used the inside market prices to determine a market change. However, it should also be understood that an automated spread trading tool may use other reference points when determining that a market change has occurred. For example, if there is not enough quantity at the best bid price, the automated spread trading tool might look to other levels of market depth outside of (or in addition to) the inside market to satisfy the order. Then, instead of (or in addition to) using the inside market prices, it might take the average price or some other price based on the levels of depth it used, however, this concept is described more with respect to step 506. Various approaches to determining when a market change has occurred may be used, such as by selecting "Adjust For Market Depth," which are further described in the above incorporated U.S. patent application Ser. No. 10/137,979, filed on May 3, 2002 and entitled, "System and Method for Performing Automatic Spread Trading." Then, the average price or some other price found may be used to calculate an effective spread order price, which is described more below with respect to step 506.

At step 506, the spread trading tool calculates an effective spread order price. The effective spread order price may be based on orders in legs in which the market has not moved and the new inside market price of the leg which has received the market update. As previously mentioned above, instead of using the inside market price to calculate an effective spread order price, the average price or some other price found may be used.

According to the preferred embodiments, any particular relationship may be used to calculate the effective spread order price and therefore the present invention is not limited as such. However, for completeness, U.S. patent application Ser. No. 10/137,979, entitled, "System and Method for Performing Automatic Spread Trading" may be referred to for some example relationships to determine a spread order price based on information in the other legs to maintain a spread order price.

According to another embodiment, instead of receiving and waiting for a market update, the automated spread trading tool may continuously calculate the effective spread order price. For example, the preferred embodiments may be programmed to calculate the effective spread order price every second or at some other time interval. If this embodiment is used, then steps 502 and 504 are not necessary as the effective spread order price is calculated at predetermined time intervals instead of when a market update is received.

At step 508, the change between the desired spread order price and the effective spread order price (e.g., found in step 506) is determined. In other words, the number of price units between the desired spread order price and its effective spread order price is determined. To illustrate step 508, consider a desired spread order price of "50." Subsequently, assume that market conditions changed in a leg for which the spread order at "50" is based in part upon. Then, according to step 506, an effective spread order price would be preferably calculated. Let us suppose the effective spread order price is "52." According to step 508, the change in this example scenario is equal to the absolute difference between the desired spread order price of "50" and the effective spread order price of "52," which according to this example is "2."

At step 510, one or more of the appropriate tolerance parameters are retrieved. A trader can input one or more ranges such that each range represents an acceptable level of movement in the market. In the preferred embodiments, these ranges are preferably used to limit the frequency at which automated or semi-automated trading tools move or re-price orders in an exchange order book. There can be as many ranges as the trader prefers. Moreover, each leg of the spread may have its own set of one or more ranges.

According to the preferred embodiments, each range has parameters associated with it, referred to as an "inside parameter" and an "outside parameter." Using the inside parameter and/or the outside parameter, the automated spread trading tool will preferably refrain from moving or re-pricing orders when the change between the desired spread order price and the effective spread order price (e.g., found in step 506) remains within the tolerance levels given by at least one of the inner and/or outer parameters. Additionally, the automated spread trading tool will preferably move or re-price appropriate leg orders only when the change between the desired spread order price and the effective spread order price (e.g., found in step 506) is determined and that the change is beyond the tolerance level associated with the inner and/or outer parameters. The inside and outside parameters are similar to inside and outside slop parameters that are described in great detail in the above incorporated U.S. patent application Ser. No. 10/137,979, entitled, "System and Method for Performing Automatic Spread Trading." The reader is encouraged to reference the above patent application for information regarding the inside and outside slop parameters. It should also be understood that the preferred embodiments do not require having two parameters (e.g., the inside parameter and the outside parameter), but may be implemented using only one parameter or many parameters, whichever is desired.

According to the preferred embodiments, a set of one or more ranges of inside and/or outside parameters which are retrieved preferably correspond to the leg for which an order may be moved or re-priced. For example, consider when there are two legs underlying a spread. Assume that the order in leg 2 is based on the market conditions in leg 1 and the market conditions in leg 1 have just changed. The difference in the effective and desired spread order prices would preferably be determined in step 508. Next, the preferred embodiments would retrieve the set of range(s) of inside and/or outside parameters that correspond to leg 2. Then, the preferred embodiment may determine which range to use (if there is more than one) out of the set. For example, in the preferred embodiment, if there is more than one range, the difference between the spread order price and the inside market determines the range. In other words, each range includes a set of price levels and if the desired spread order price is one of those price levels, then that particular range is used. The concept of ranges and how they are used in the preferred embodiments are described more below.

At step 512, once a range is retrieved, the spread order price difference or change is compared with the inside parameter or the outside parameter (whichever is relevant to use) given in that range to determine if one of the leg orders should be moved or re-priced. Alternatively, the leg order price difference or change is compared with the inside parameter or outside parameter given in that range to determine if one of the leg orders should be moved or re-priced.

According to the preferred embodiments, the change in spread order prices (e.g., determined in step 508) is compared with the inside parameter or outside parameter (e.g., retrieved from step 510). If the magnitude of the change is within the appropriate inside and/or outside parameters, then preferably no change is necessary at step 516. For example, the trader is willing to let the spread trade for more or less (e.g., depending on if the spread order is a buy or a sell order) than the desired spread order price indicates. If the magnitude of the change falls outside of the appropriate inside and/or outside parameters, the one or more leg orders under consideration are preferably re-priced and moved in the market to maintain the desired spread order price, at step 514.

IV. Ranges and Parameters

As pointed out earlier, each leg preferably has its own set of one or more ranges. Preferably, these sets of ranges are determined in advance before actual trading takes place. It is also envisioned, however, that multiple legs can share a set of one or more ranges, if so desired. Additionally, each range and its parameters are preferably configurable. Moreover, the ranges and/or parameters may be dynamic, for example, they can be driven by an equation or an outside source.

Table 1 below gives an example of what a set of one or more ranges might include. In particular, Table 1 below shows three ranges and their corresponding tolerance parameters, although any number of ranges may be setup. The values in Table 1 can be used for comparing with both buy spread orders and sell spread orders. Alternatively, values in Table 1 may be used for comparing with only buy spread orders and a separate table could be used for comparing with only sell spread orders. Nonetheless, when a desired spread order falls within a given range, then that range's parameters are preferably used to evaluate whether a leg order should be moved or re-priced to maintain the desired spread order price.

Figure 7:
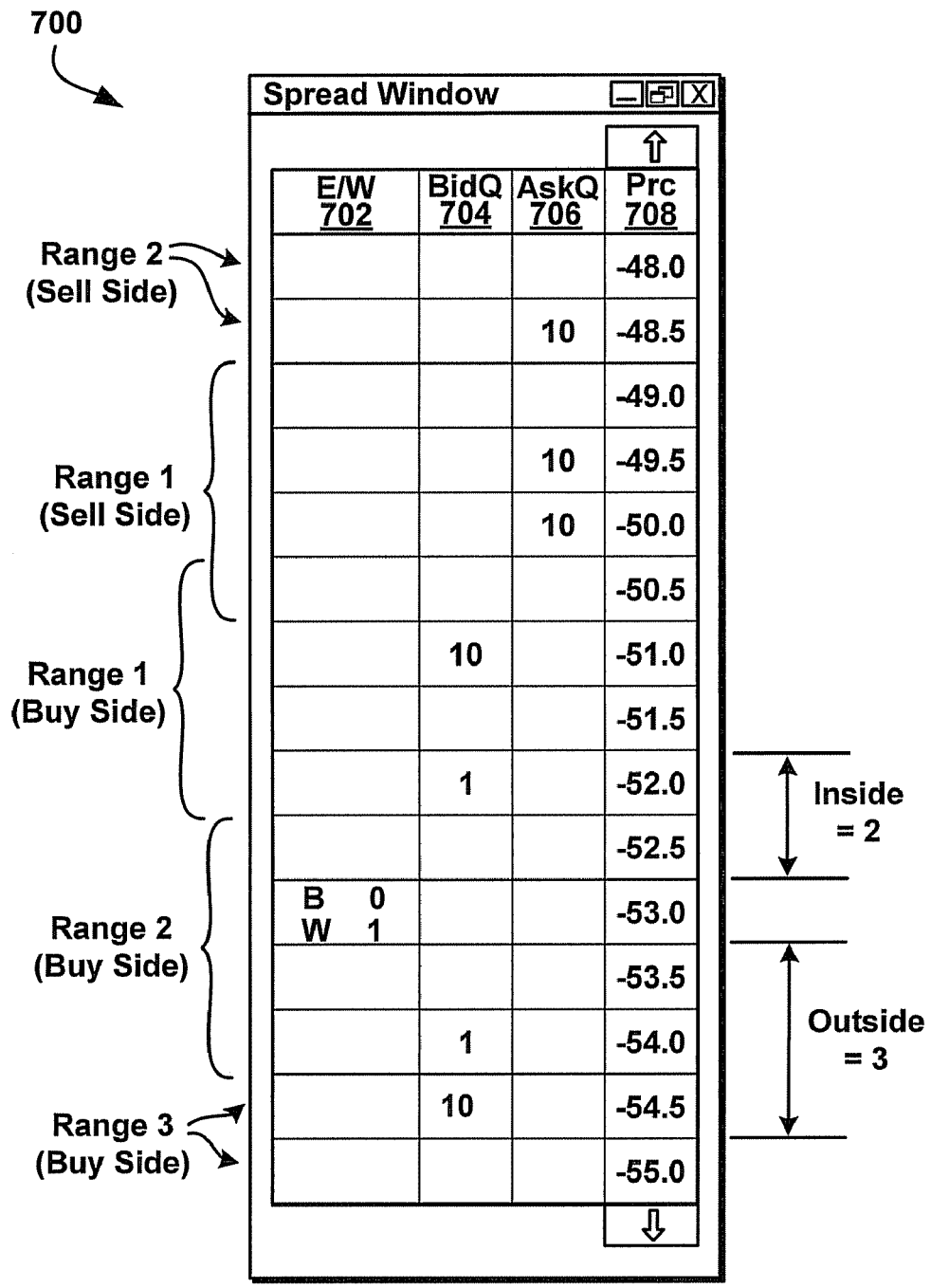
FIG. 7 is a block diagram that represents a display of a spread market which is used to illustrate the preferred process shown in FIG. 5.

For ease of illustration, Table 1 is described with respect to the synthetic spread shown in FIG. 7. Referring briefly to FIG. 7, an example of a generated spread data feed is displayed in a spread window. For ease of explanation, this particular spread is based on two legs. The market data displayed in the spread window was calculated using relationships that exist between the two legs, each leg is shown in FIGS. 8 and 9, respectively.

According to one embodiment, the ranges for buy spread orders preferably start from the best offer, and the ranges for the sell spread orders preferably start from the best bid. For example, referring to FIG. 7, the best offer is −50 and for any buy spread orders, range 1 (e.g., $0 \leq X < 5$) would include price levels or ticks −50.5, −51.0, −51.5, and −52.0. Similarly, the best bid is −51.0 and for any sell spread orders, range 1 would include price levels or ticks −50.5, −50.0, −49.5, and −49.0. For any buy spread orders, range 2 (e.g., $5 \leq X < 10$) corresponds to price levels −52.5, −53.0, −53.5, and −54.0. For any sell spread orders, range 2 includes price levels −48.5, −48.0, −47.5, and −47.0. For any buy spread orders, range 3 (e.g., $10 \leq X < \infty$) corresponds to price levels −54.5, −55.0, −55.5, −60.0, and so on. For any sell spread orders, range 3 corresponds to price levels −46.5, −46.0, −45.5, −45.0, and so on.

TABLE 1

| | Range No.: | | |
|---|---|---|---|
| | 1 | 2 | 3 |
| Range: | $0 \leq X < 5$ | $5 \leq X < 10$ | $10 \leq X < \infty$ |
| Inside: | 1 | 3 | 5 |
| Outside: | 2 | 3 | 5 |

Alternatively, the ranges could correspond to integer price levels. For example, for any buy spread orders, range 1 might include integer price levels −50, −51, −52, −53, and −54 rather than tick levels used directly above. For any sell spread orders, range 1 might include integer price levels −50, −49, −48, −47, and −46. The present invention may utilize any unit of measure to define the ranges and therefore the present invention is not limited to the increments used or described in this application.

Moreover, the buy side ranges could start from the best bid or some other designated reference point (e.g., last traded price (LTP), last traded quantity (LTQ), a theoretical price, or some other reference point), and the sell side ranges could start from the best offer or some other designated reference point (e.g., last traded price (LTP), last traded quantity (LTQ), a theoretical price, or some other reference point). Therefore, it should be understood that the present invention is not limited to where a range starts and ends or what price levels a range is referenced from.

Figure 6:
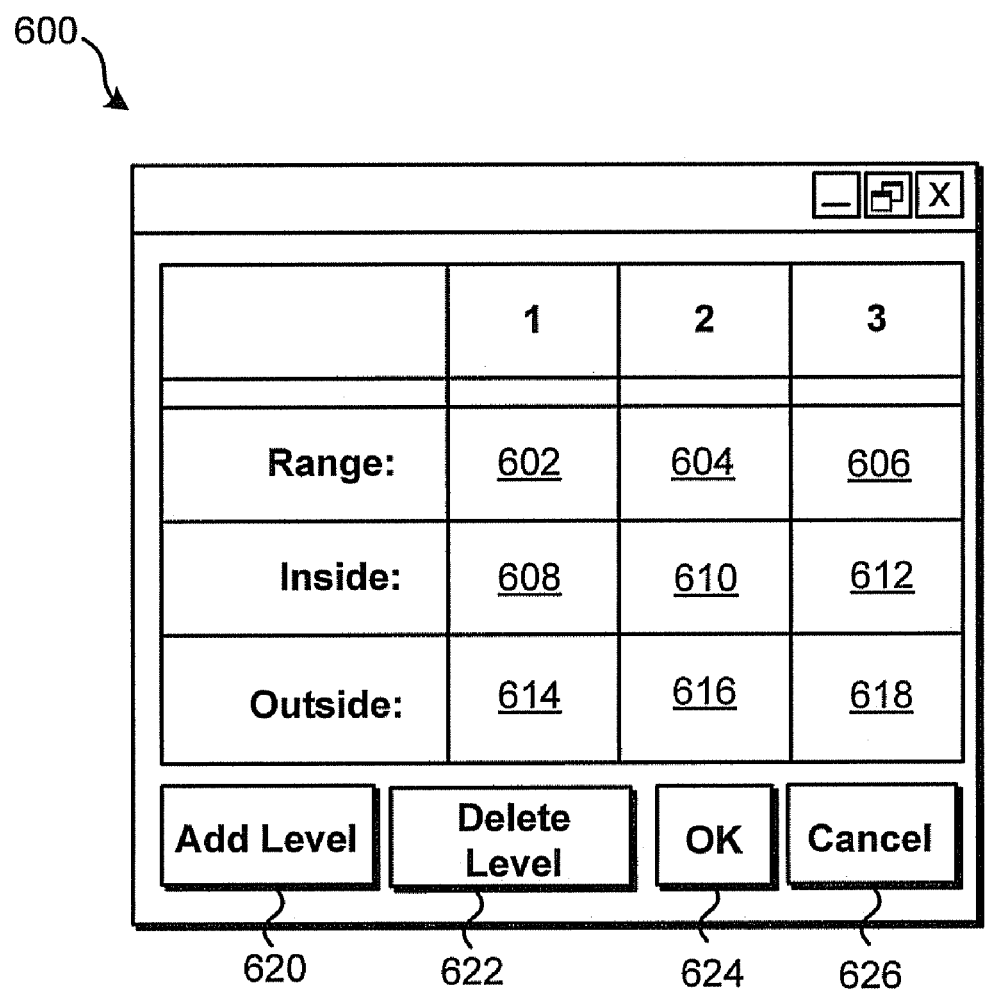
FIG. 6 is a block diagram that represents a graphical user interface for inputting and/or displaying ranges and parameters associated with the preferred embodiments.

FIG. 6 shows a display 600 for inputting range values and parameters. According to display 600, there are three ranges 602, 604, and 606, although any number of ranges may be shown. For example, only one range might be shown, or only two ranges, or only four ranges, and so on. Also, only one parameter may be used, if so desired. Range 602 has an inside parameter and an outside parameter designated in fields 608, 614, respectively. Referring to the display 600, range 604 has an inside and outside parameters designated in fields 610, 616. Range 606 has an inside and outside parameters designated in fields 612, 618. If the trader wants to add an additional range or level, he or she can select icon 620. If the trader wants to delete a range or level, he or she can select the range and select icon 622. Icons 624 and 626 are used to accept or cancel changes.

V. Spread Trading Example

FIG. 7 shows a display 700 of a spread market, which is based on legs shown in FIGS. 8 and 9. The display 700 shows a working column 702, bid quantity column 704, ask quantity column 706, and price column 708. The working column 702 displays working orders to buy or sell tradeable objects. The bid quantity column 704 displays quantities associated with the price levels in price column 708. The ask quantity column 706 displays quantities associated with the price levels in price column 708. The price column 708 shows price levels in one tick increments (prices can be positive or negative). FIGS. 8 and 9 show similar columns to that shown in FIG. 7 and are referenced by like numerals. It should be understood, however, that it is not necessary to understand the details of the display (shown in FIGS. 7-9).

As previously mentioned, a set of ranges and parameters are preferably entered for each leg. In other words, using a display such as shown in FIG. 6, ranges can be set and parameters for each range can also be set for each leg. Then, for example, if re-pricing in one leg involves a high transaction fee, the tolerance for market movement can be higher whereas if re-pricing in another leg involves a very low transaction fee, the tolerance for market movement can be set lower. However, a set of one or more ranges may be shared between legs, if so programmed.

Table 2 (for the leg shown in FIG. 8) and Table 3 (for the leg in FIG. 9) below show example range levels and parameters. The ranges shown in the tables are the same for ease of explanation, but the present invention is not limited to such. Therefore, each table could have different ranges and inside/outside parameters from each other, if so desired. As pointed out earlier, these values can be input through any type of display, an example of which is shown in FIG. 6.

TABLE 2

| (for the leg shown in FIG. 8) | | | |
|---|---|---|---|
| | Range No.: | | |
| | 1 | 2 | 3 |
| Range: | $0 \leq X < 5$ | $5 \leq X < 10$ | $10 \leq X < \infty$ |
| Inside: | 1 | 3 | 5 |
| Outside: | 2 | 3 | 5 |

TABLE 3

| (for the leg shown in FIG. 9) | | | |
|---|---|---|---|
| | Range No.: | | |
| | 1 | 2 | 3 |
| Range: | $0 \leq X < 5$ | $5 \leq X < 10$ | $10 \leq X < \infty$ |
| Inside: | 2 | 2 | 6 |
| Outside: | 3 | 3 | 6 |

Referring to FIG. 7, an order to buy 1 of the spread is shown at a price of −53.0. As a result, the spread trading tool automatically would send orders into the market for the legs of the spread. The leg orders consist of an order to buy 1 at 147.0, which is shown in FIG. 8, and an order to sell 1 at 203.0, which is shown in FIG. 9. According to one embodiment, the order to buy 1 at 147.0 is based on the best bid price in the leg shown in FIG. 9, and the order to sell 1 at 203.0 is based on the best offer price in the leg shown in FIG. 8.

Ordinarily when the inside and/or outside values are set to "0" and the market conditions change in the leg shown in FIG. 8, the order in the leg shown in FIG. 9 is preferably re-priced so that the spread shown in FIG. 7 is maintained at −53. Likewise, when the market conditions change in the leg shown in FIG. 9, the order in the leg shown in FIG. 8 is preferably re-priced so that the spread shown in FIG. 7 is maintained at −53. If market conditions change, but the orders are not re-priced, then the desired spread price achieved will not be what is shown in FIG. 7, rather it will be at an effective price that is higher or lower than −53 depending on which way the market moves. However, in a practical sense, the automated spread trading tool will ordinarily move or re-price those orders so that the desired spread price is maintained.

However, by setting the inside and/or outside parameters to some value other than "0," the automated spread trading tool may be refrained from constantly moving or re-pricing the orders in legs to sustain the desired spread price. For example, assuming a one to one ratio (e.g., market changes by one tick results in the spread moving one tick) consider when the market moves up one tick in the leg shown in FIG. 9. The spread trading tool will preferably calculate an effective spread order price. Accordingly, the appropriate range and parameters are retrieved.

According to the preferred embodiments, the appropriate parameters are parameters that are associated with the leg in which a possible order change might occur. In this example, the parameters associated with the leg shown in FIG. 8 are retrieved (e.g., parameters in Table 2) as the leg order price in FIG. 8 might have to be moved or re-priced depending on the next analysis.

FIG. 7 shows various range levels using brackets for ease of illustration. If a desired spread order price falls within one of the ranges, then the parameters for that range apply. For any buy spread orders, range 1 (e.g., $0 \leq X < 5$) would include price levels or ticks −50.5, −51.0, −51.5, and −52.0. Note that some other price unit may be used instead of 0.5 increments. Similarly, the best bid is −51.0 and for any sell spread orders, range 1 would include price levels or ticks −50.5, −50.0, −49.5, and −49.0. Again, some other price unit may be used instead of 0.5 increments. For any buy spread orders, range 2 (e.g., $5 \leq X < 10$) corresponds to price levels −52.5, −53.0, −53.5, and −54.0. For any sell spread orders, range 2 includes price levels −48.5, −48.0, −47.5, and −47.0. For any buy spread orders, range 3 (e.g., $10 \leq X < \infty$) corresponds to price levels −54.5, −55.0, −55.5, −60.0, and so on. For any sell spread orders, range 3 corresponds to price levels −46.5, −46.0, −45.5, −45.0, and so on.

Accordingly, the desired buy spread order price is in one of the price levels in range 2. Range 2 in Table 2 results in an inside parameter of "3" and an outside parameter of "3." Because the effective spread order price was only one tick difference from the desired spread order price, the calculated price falls with the boundaries (3 ticks above −147.0 and/or 3 ticks below −147), or equivalently, the change in prices is less than 3 ticks. Therefore, the working leg order in FIG. 8 will not have to be moved or re-priced. Then, if the trade had occurred at that moment, the trader would buy/sell the spread at the effective spread price. If, however, the effective spread order price fell outside of the inside and/or outside parameters, then the working leg order would preferably be moved or re-priced in the market to maintain the desired spread order price of −53.

VI. Conclusion

The preferred embodiments provide a flexible solution as they give a trader many possible options to configure how and when to limit the frequency at which such trading tools mover or re-price orders in the market. The preferred embodiments allow for one or more tolerance levels to be set to determine when to move or re-price orders in the market. Also, the preferred embodiments may be used with any trading strategy to regulate order entry.

The foregoing description is presented to enable one of ordinary skill in the art to make and use the invention. Various modifications to the preferred embodiment will be readily apparent to those skilled in the art and the generic principles herein may applied to other embodiments. Therefore, it should be understood that the above description of the preferred embodiments, alternative embodiments, and specific examples are given by way of illustration and not limitation. Many changes and modifications come within the scope and spirit of the following claims and equivalents thereto are claimed as the invention.

What is claimed is:

1. A method for variably regulating order entry in an electronic trading application, the method comprising:

establishing a spread between a first tradeable object and a second tradeable object;

receiving a first market data for the first tradeable object, the first market data comprising a first inside market that represents a highest bid price currently available for the first tradeable object and a lowest ask price currently available for the first tradeable object;

receiving a second market data for the second tradeable object, the second market data comprising a second inside market that represents a highest bid price currently available for the second tradeable object and a lowest ask price currently available for the second tradeable object;

receiving a desired spread price to buy or sell a certain quantity of the spread;

sending a trade order to buy or sell the first tradeable object with a price that is based on the desired spread price to buy or sell the certain quantity of the spread, and further based on the second inside market;

receiving a change in the second inside market;

computing an effective spread price based on the price of the trade order and further based on the changed second inside market, the effective spread price representing a current price for the spread;

establishing a plurality of ranges, each range comprising a different value that represents a difference between the effective spread price and the desired spread price;

selecting a specific range from the plurality of ranges based on the desired spread price;

using a value from the specific range to determine whether the effective spread price is within a range of price levels determined by the value and the desired spread price;

when the effective spread price falls outside of the range of price levels, replacing the trade order with a second trade order to buy or sell the first tradeable object with a second price that is based on the desired spread price to buy or sell the certain quantity of the spread, and further based on the changed second inside market;

and when the effective spread price is within the range of price levels, maintaining the trade order at the price.

2. The method of claim 1 further comprising sending the trade order with the price that is further based on a definition for the spread.

3. The method of claim 1, wherein the step of establishing the spread comprises establishing a definition for the spread that is used to determine whether to buy or sell the first tradeable object and whether to buy or sell the second tradeable object.

4. The method of claim 1, wherein the specific range comprises a plurality of price levels.

5. The method of claim 1, wherein the specific range comprises a single price level.

6. The method of claim 1, wherein the step of selecting the specific range comprises determining that the desired spread price is within the specific range.

7. The method of claim 1, wherein the trade order is based on the highest bid price of the second inside market when the spread comprises selling the second tradeable object.

8. The method of claim 1, wherein the trade order is based on the lowest ask price of the second inside market when the spread comprises buying the second tradeable object.

9. The method of claim 1, wherein the step of replacing the trade order with a second trade order comprises deleting the trade order and sending the second trade order at the second price to the electronic exchange.

10. The method of claim 1, wherein the spread is between additional tradeable objects.

* * * * *